May 8, 1934.  W. T. WALKER  1,958,026
AUTOMOBILE HOIST
Filed Jan. 16, 1933   7 Sheets-Sheet 1

Fig. 1.

Inventor
Willard T. Walker
By Barnett & Truman
Attorneys.

May 8, 1934. W. T. WALKER 1,958,026
AUTOMOBILE HOIST
Filed Jan. 16, 1933 7 Sheets-Sheet 3

Inventor
Willard T. Walker
By Barnett & Truman
Attorneys.

May 8, 1934.   W. T. WALKER   1,958,026
AUTOMOBILE HOIST
Filed Jan. 16, 1933   7 Sheets-Sheet 4

Inventor
Willard T. Walker
By Barnett & Truman
Attorneys

May 8, 1934. W. T. WALKER 1,958,026
AUTOMOBILE HOIST
Filed Jan. 16, 1933 7 Sheets-Sheet 5

Fig. 6.

Inventor
Willard T. Walker
By Barnett Truman
Attorneys.

Patented May 8, 1934

1,958,026

UNITED STATES PATENT OFFICE 1,958,026

AUTOMOBILE HOIST

Willard T. Walker, Racine, Wis., assignor to Walker Manufacturing Company, Racine, Wis., a corporation of Wisconsin Application January 16, 1933, Serial No. 651,977

28 Claims. (Cl. 254—144)

This invention relates to certain new and useful improvements in a hoist, and more especially a hoisting apparatus particularly adapted for use at a garage or service station for bodily elevating an automobile so that easy access may be had to the under portions of the chassis for lubricating the same or making repairs.

Briefly described, the apparatus embodies a plurality of separate upright posts or standards positioned adjacent the corners of a clear space into or through which the automobile may be run. An open carriage structure adapted to support the automobile is suspended between the posts by a group of cables, one adjacent each post, and suitable winding mechanism carried by the upper portions of the posts is adapted to draw in or pay out the cables so as to raise or lower the automobile. A motor unit for operating the winding mechanism is supported adjacent the upper end of one of the posts so as to be easily accessible and out of the way. When the automobile is elevated, the entire space beneath the automobile is clear, and only the posts remain adjacent this space so that a maximum of accessibility is provided. Improved control and safety mechanisms are provided as hereinafter specifically described.

While this improved hoisting apparatus is especially designed for elevating or lowering an automobile or similar vehicle, it will be apparent as the description proceeds that many features thereof are equally adapted for use with hoisting apparatus adapted for other purposes.

The principal object of this invention is to provide an improved hoist such as briefly described hereinabove and disclosed more in detail in the specifications which follow.

Another object is to provide an improved automobile hoist that is simple and economical to construct and install.

Another object is to provide an improved automobile hoist that is positioned substantially entirely above the ground or other supporting floor so that no extensive pits need be excavated, nor will any open pits or recesses remain beneath the automobile when it is elevated.

Another object is to provide an improved form of cable elevating and suspension means for the hoist.

Another object is to provide an improved motor unit for actuating the elevating and lowering means.

Another object is to provide improved control mechanism for the motor unit and elevating and lowering means whereby the operation thereof will be automatically stopped when the automobile has reached either its upper or lower limits of travel and which cannot be started in the wrong direction.

Another object is to provide improved carriage guides adapted to function as safety means for supporting the carriage.

Another object is to provide improved safety latch mechanism adapted to support the carriage from the posts, independently of the cables, in its elevated positions.

Another object is to provide improved means for simultaneously operating the safety latches from one corner of the carriage.

Another object is to provide means for automatically projecting the latches to operative position when the carriage has reached its elevated position.

Another object is to provide interlocking mechanism for preventing operation of the lowering mechanism when the safety latches have been projected to operative position with the carriage elevated.

Other objects and advantages of this invention will be more apparent from the following detailed description of certain approved forms of mechanisms constructed and operating according to the principles of this invention.

In the accompanying drawings:

Fig. 15 is a small diagrammatic horizontal section, similar to Fig. 3, showing a modified form of carriage.

The apparatus may be described in general as comprising a fixed supporting frame or structure indicated at A, a vertically movable carriage B for supporting the automobile, a cable hoisting mechanism indicated generally at C, which is mounted on the frame A and from which the carriage B is suspended, a motor unit D mounted at one upper corner of frame A for actuating the hoisting mechanism C, an automatic stop mechanism E cooperating with the switch mechanism F by means of which the motor is controlled, a safety latch mechanism G mounted on the carriage B and adapted to engage the frame A to hold the carriage in its elevated positions, an interlocking mechanism H which prevents lowering of the carriage while the latch mechanism G is in operative position with the carriage B completely elevated, and safety guides K which slidably support the carriage B within frame A.

Figure 1:
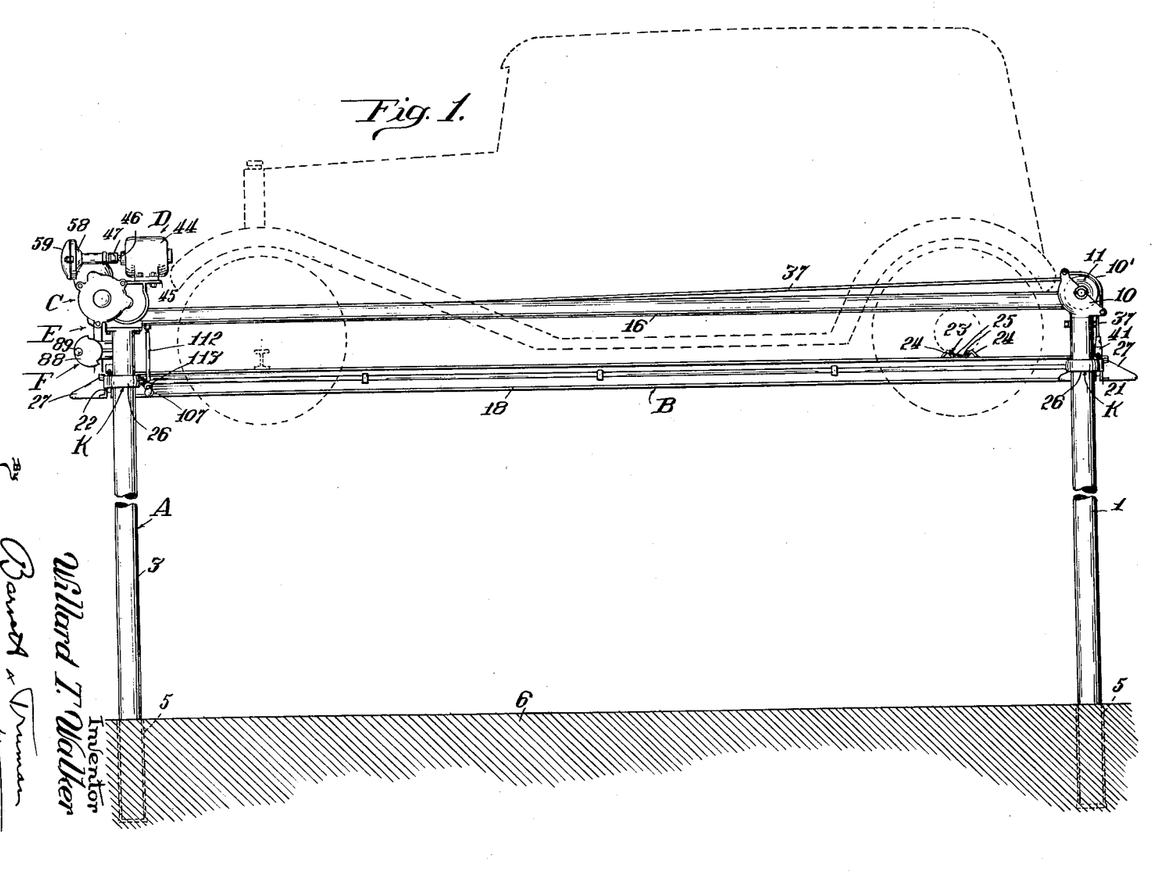
Fig. 1 is a side elevation of the hoisting apparatus in elevated position, the corner-posts being partially broken away intermediate their ends.
Figure 12:
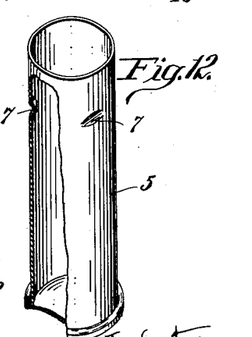
Fig. 12 is a detail view showing one of the post-supporting sockets.

The frame A comprises four similar upright posts or standards 1, 2, 3 and 4, preferably in the form of hollow metallic pipe sections, which are mounted outside of but adjacent four corners of a rectangular clear space suitable for receiving the automobile or other vehicle to be hoisted. The posts are fixedly supported in any suitable manner, preferably by embedding the lower end portions thereof in the ground or other supporting foundation. As shown in Figs. 1 and 12, sheet metal socket members 5 are first embedded in the concrete foundation 6 at the desired positions. These socket members 5 are of a size adapted to snugly receive the lower portions of the posts and preferably each socket has one or more indentations 7 rolled or otherwise formed in a side wall thereof so as to insure a snug frictional grip with the post inserted therein.

Figures 3, 13, 14:
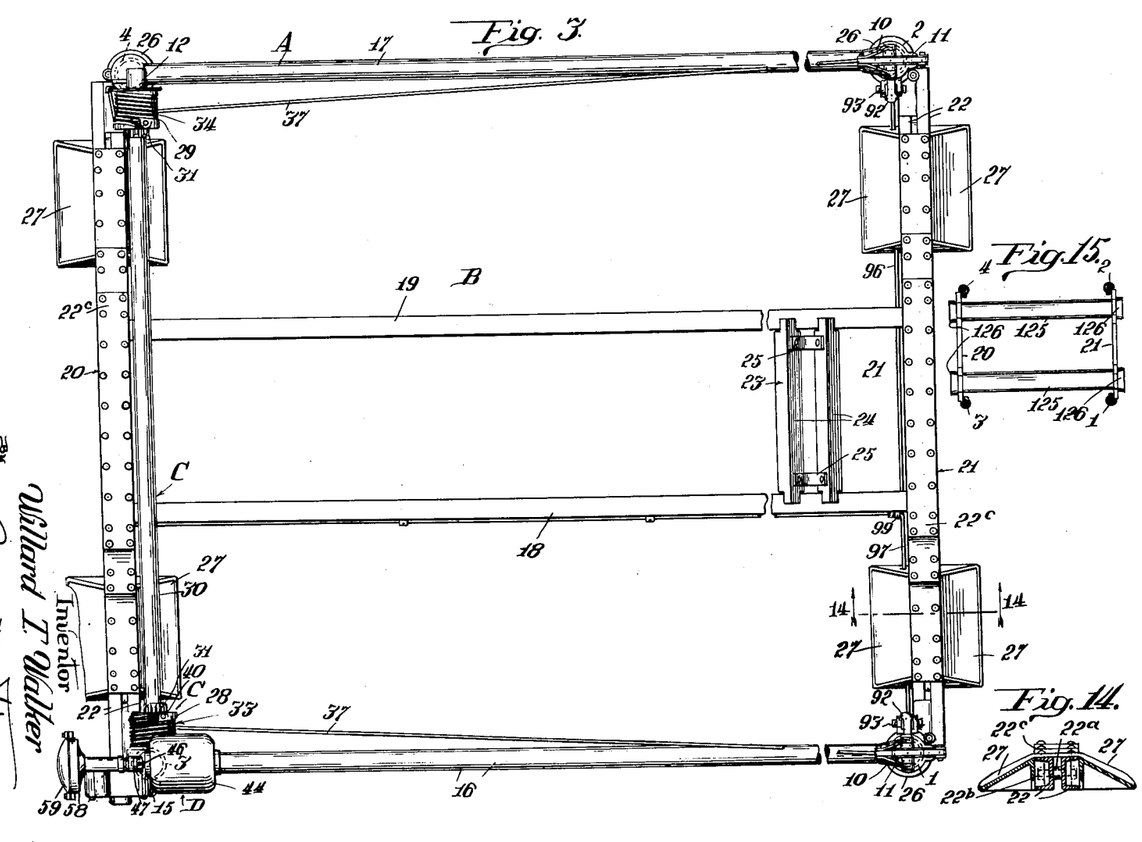
Fig. 3 is a plan view of the apparatus, partially broken away intermediate its ends.
Fig. 13 is a detail view showing a modified means for supporting the posts or uprights.
Fig. 14 is a detail vertical section through one of the ramps, taken substantially on the line 14—14 of Fig. 3.

If it is not convenient to support the posts in this manner, as for example where the hoisting apparatus is mounted on the floor of a garage, the lower end of each post may be provided with an outstanding flange portion 8 (see Fig. 13) which is bolted or otherwise secured to the floor, as indicated at 9.

At the upper end of each of the posts 1 and 2 at one end of the frame is mounted a casting 10 in which is journaled a freely rotatable direction sheave 11. A guard 10' is secured to casting 10 to prevent contact with the exposed portion of the sheave 11. At the upper end of one post 4 at the other end of the machine is mounted a casting 12 in which is secured one end of a non-rotatable shaft 13 (see Figs. 7 and 8) the other end of this shaft being secured at 14 in a gear casing 15 mounted at the upper end of the post 3. The upper ends of posts 1 and 3 at one side of the frame are connected by a horizontal beam or pipe section 16 connected with the castings 10 and 15, respectively, and the upper ends of posts 2 and 4 at the other side of the frame are connected by a similar beam 17 connected with the castings 10 and 12. It will thus be seen that the supporting frame structure A is entirely open at one end (between the posts 1 and 2) and the other three sides of the frame are open except for the beams 16 and 17 and shaft 13 which connects the upper end portions of the several posts. The width of the frame is sufficient to permit an automobile to be driven or moved into the frame between the posts 1 and 2, and the length is preferably sufficient to receive the entire car within the space outlined by the several posts. The height of the frame is preferably sufficient to permit the car to be moved out at the rear between the posts 3 and 4 beneath the cross shaft 13.

The carriage B, which is preferably built up of steel angle beams, comprises a pair of similar longitudinally extending I-beams 18 and 19, and a pair of similar cross-beams 20 and 21 which are spaced apart a distance substantially equal to that between the respective pairs of end posts 1, 2 and 3, 4. Each cross beam may be built up from a pair of channel-beams 22 with interposed spacers 22$^a$ through which and the beams are secured connecting bolts 22$^b$ (see Fig. 14). Portions of the channel beams may also be connected by one or more cover plates 22$^c$ bolted or riveted to the upper surfaces of the upper beam flanges. The longitudinal beams 18 and 19 are connected at their ends to the cross-beams 20 and 21 by suitable angle plates 18$^a$.

A rest or cradle 23 which engages the differential casing to support the rear portion of the automobile is positioned on the rear portions of the beams 18 and 19. This cradle may be formed of a pair of angle bars 24 notched at their ends to engage the beams 18 and 19 and connected in properly spaced relation by the angle brackets 25. This cradle 23 is slidable lengthwise of the beams 18 and 19 so that it may be properly positioned beneath the differential of the automobile, as will be hereinafter apparent.

The safety-guides K comprise four metal loops 26, one rigidly mounted at each outer end of each cross-beam 20 and 21, each loop being of substantial vertical thickness and having a cylindrical opening therein of sufficient diameter to loosely encircle one of the posts 1, 2, 3 or 4. These loops do not normally engage the posts except to prevent excessive lateral swinging movements of the carriage, which is freely suspended by the cable mechanism hereinafter described. However, if the carriage should become canted from its normal horizontal position, by failure of some portion of the cable suspension mechanism or for any other reason, the opposite upper and lower edges of the loops will bind on the encircled posts to grip the posts and prevent dropping of the carriage and the load carried thereby.

A pair of ramps 27, (see Fig. 14), are mounted on opposite sides of each cross-beam 20 and 21, adjacent each end thereof, in position to be engaged by a wheel of the automobile to facilitate moving the automobile over the beam into or out of position within the frame.

The winding mechanism C comprises a pair of similar winding drums 28 and 29 rotatably mounted on the opposite end portions of fixed shaft 13 and connected by a torque tube or hollow shaft 30 having non-circular end portions 31 fitted onto the correspondingly shaped end hubs 32 of the drums. The two similar cables 33 and 34 are respectively wound on the two drums 28 and 29. A gear 35 is formed on the outer end of drum 28 for rotating the winding mechanism from the motor unit D, as hereinafter described. Each cable 33 or 34 is intermediately looped, as shown at 36, so as to form a long run 37 and a shorter run 38. The short runs 38 of the two cables extend downwardly adjacent the posts 3 and 4 and are connected to the respective ends of the cross member 20 of the carriage. The longer runs 37 extend longitudinally of the frame and over the direction sheaves 11, and thence downwardly adjacent the posts 1 and 2 and are connected with the respective ends of the other cross member 21 of the carriage. The intermediate looped portion 36 of the cable is passed through an opening 39 in the inner end portion of the drum 28 or 29 and anchored in place by a removable pin 40 inserted through the loop 36. As the drum is rotated, the two runs 37 and 38 of the cable are coiled side by side on the peripheral surface of the drum which is provided with a double groove for receiving and guiding the cable. The lower end portion of each of the several cable runs 37 and 38 is anchored in a fitting 41 swiveled to the upper end of an eye-bolt 42, the threaded portion of which is inserted downwardly through a suitable opening in the casting 26 at the end of the carriage cross member and held in place by nuts 43 threaded on the lower end of the bolt. By adjusting the nuts 43, the effective lengths of the cable runs may be adjusted. It will be apparent that chains or other flexible means might be substituted for the metallic cables here shown by way of example, and such equivalents are contemplated as being covered by the term "cables" as herein used.

Figures 7, 13:
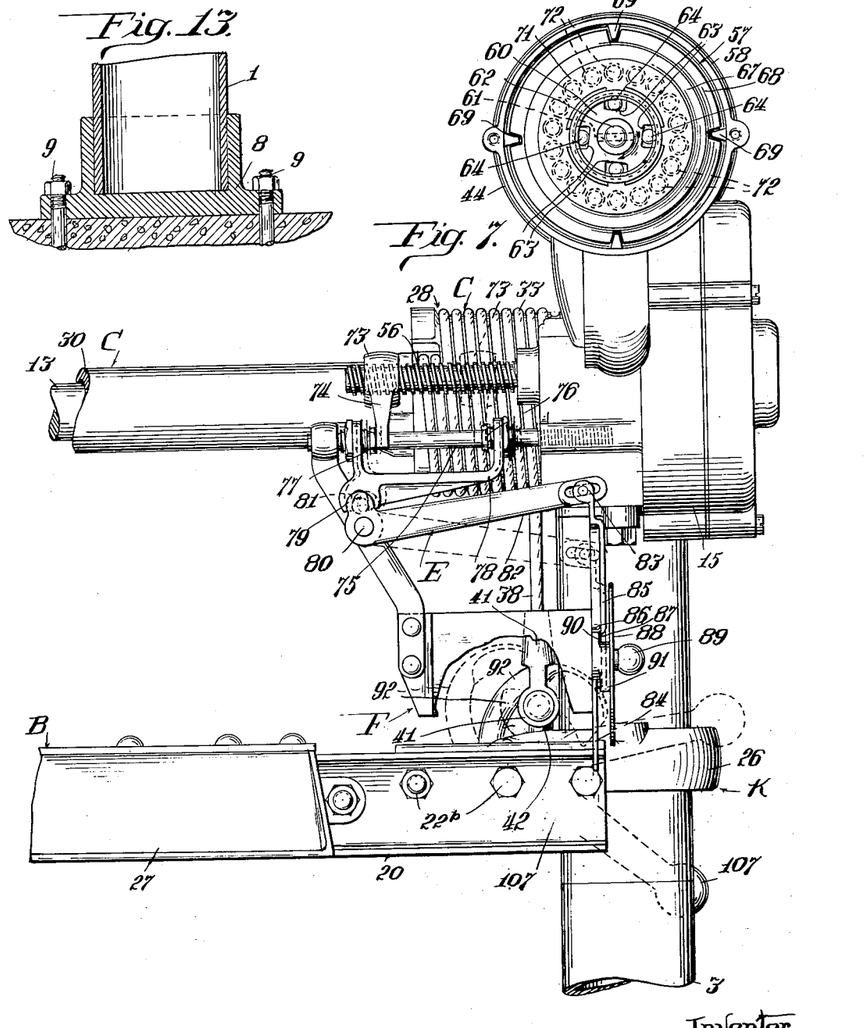
Fig. 7 is an end elevation of the mechanism shown in Fig. 6, the view being taken looking from the left and with the cover of the brake mechanism removed.

The motor driving unit indicated as a whole at D is positioned at the upper end of post 3 and mounted in or on the gear casing, indicated generally at 15. This driving mechanism comprises a small reversible electric motor 44 supported on bracket 45, the motor shaft 46 being connected through coupling 47 with a worm shaft 48 journaled in bearings 49 and 50. The winding drums are driven from this worm shaft through a chain of reduction gearing comprising the worm wheel 51, small spur gear 52, large intermediate spur gear 53, and small spur gear 54 which meshes with the gear 35 formed on one end of winding drum 28. The intermediate gears 53 and 54 are keyed on an intermediate shaft 55 which has a screw 56 formed on a projecting portion thereof (see Fig. 7), this screw forming the driving element of the stop-mechanism E hereinafter described. As motor 44 is rotated in one direction or the other, the winding mechanism will be rotated to either draw in or pay out the cables so as to raise or lower the carriage B. The worm 48 engaging the worm wheel 51 will ordinarily function, through the reducing gearing, as a locking means to hold the carriage and its load in any elevated position. As an additional holding means and to prevent over-running of the mechanism during the lowering operation, a brake or friction-drag, indicated generally at 57, is provided. This mechanism is mounted in a casing 58 provided with a removable cover plate 59. A cage 60 keyed at 61 on the projecting end portion 62 of worm shaft 48 is formed with a plurality of peripheral recesses 63 which are deeper at one end than the other, each of the recesses housing a clutch roller 64. A sleeve 65 rotatable about the rollers 64 carries a pair of friction discs 66 and 67 slidably keyed to the sleeve and positioned at each side of a central friction disc 68, which is fixedly keyed at 69 in the casing 58. The friction disc 66 is held by a stop 70 at one end of sleeve 65, and a cage 71 fixed on the opposite end portion of the sleeve carries a plurality of springs 72 bearing against the other friction disc 67, whereby the non-rotatable friction disc 68 is frictionally clamped at all times between the two rotatable friction discs 66 and 67. When the motor 44 and driving worm shaft 48 are rotated in a direction to elevate the load, that is in a counter-clockwise direction, as seen in Fig. 7, the clutch-rollers 64 will move to the deeper ends of the recesses so as to turn freely, and the friction discs 66 and 67 will not rotate with the worm shaft so that the brake will be ineffective. However, when the motor is rotated in the opposite direction so as to lower the load, the rollers 64 will move into the shallower ends of the recesses 63 so as to lock the sleeve 65 and friction discs 66 and 67 so that they will rotate with the worm shaft 48 and exert a constant frictional drag on the fixed disc 68. This added frictional resistance will prevent over-running of the load during the lowering operation. Any other suitable form of one-way clutch could be used in this friction drag mechanism.

The stop mechanism E comprises a nut or traveller 73 threaded on the screw shaft 56, already described, and having a yoke portion 74 slidable along the fixed guide rod 75 so as to prevent rotation of the nut. As the threaded shaft 56 is rotated in one direction or the other, the nut 73 will be moved longitudinally so as to engage at the respective ends of its travel with either of the adjustable nuts 76 or 77 carried in the arms of the yoke-shaped carriage 78, also slidable on rod 75. The short arm 79 of a bell-crank lever pivoted at 80 has a knuckle-joint at 81 with the carriage 78. The longer arm 82 of the bell-crank has a pin and slot connection at 83 with the upper end of a slide-plate 84 having an offset portion 85 so as to provide an upwardly facing shoulder 86 and a downwardly facing shoulder 87.

The switch mechanism indicated at F, which may be of a standard form, is provided on the outer end of its operating shaft with a disc 88 provided with a handle or knob 89. By rotating this disc through an angle of 90° in a clockwise direction (see Fig. 6), the motor will be started to elevate the automobile. If the disc 88 is rotated through an angle of 90° in a counter-clockwise direction (from the neutral position shown in Fig. 6) the motor will be operated to lower the load. Mounted on the rotatable shaft of the switch mechanism, directly behind the disc 88, are two offset crank arms 90 and 91 which are respectively moved into the path of the vertically movable shoulders 86 and 87 on plate 84 when the switch is moved to either its "up" or "down" positions. Assuming that the switch knob 89 has been swung to elevate the load, when the carriage B has reached its upper limit of travel, the nut or traveller 73 will have moved to the left along the threaded shaft 56 so as to engage the adjustable nut 77 and move carriage 78 to the left (Fig. 7) thereby swinging up the longer arm 82 of the bell-crank and elevating the slide plate 84. The shouldered portion 86 of this plate will engage the crank arm 90 and throw the switch back to the neutral position shown in the drawings. When the load is being lowered and the switch has been thrown to the down position, the nut 73 will engage the adjustable nut 76 on carriage 78 and swing the bell-crank down to lower the plate 84 and cause shoulder 87 to engage the crank arm 91 and throw the switch to the neutral position, again stopping the motor when the carriage has been completely lowered.

Figure 6:
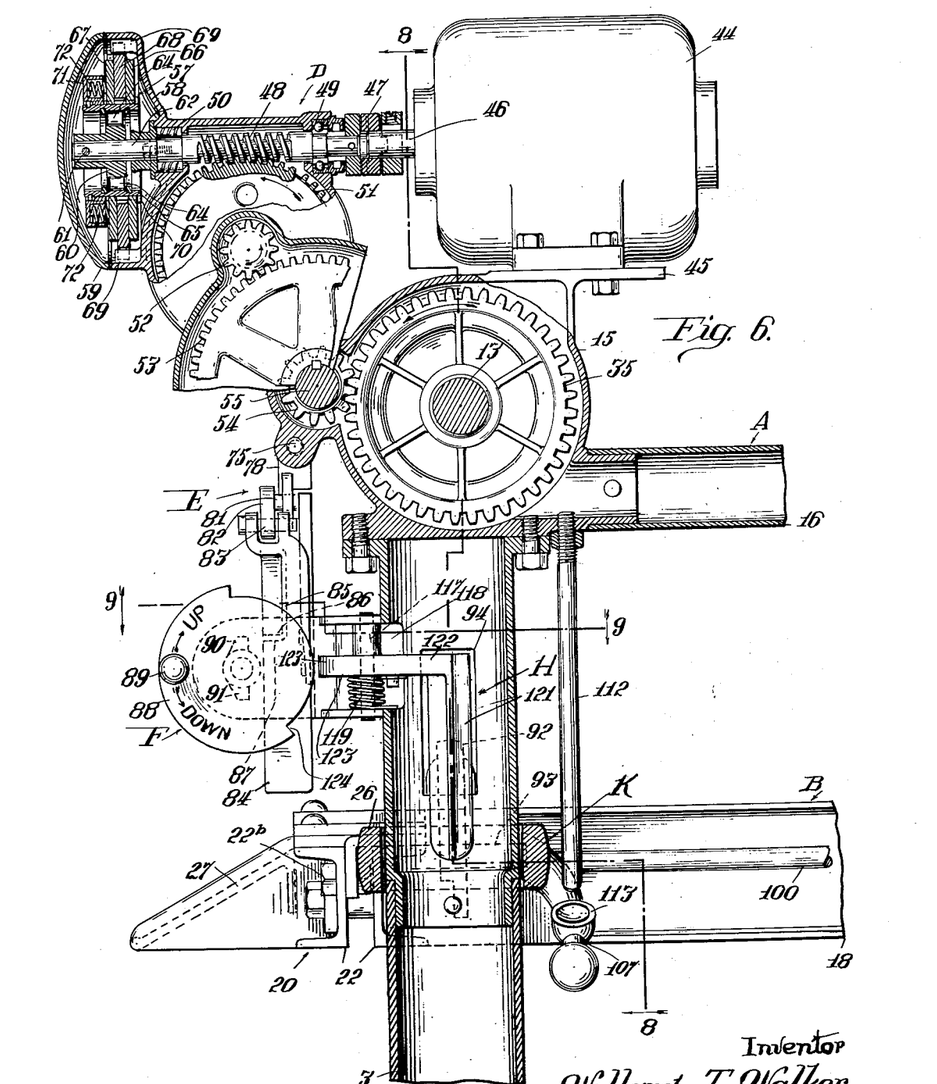
Fig. 6 is a partial elevation and partial vertical section of the motor unit and associated mechanisms as seen in Fig. 1.

It will be noted that after the carriage has been automatically stopped in its elevated position as indicated in Figs. 6 and 7, the edge of the lower half of plate 84 is interposed in the path of rotation of crank-arm 90 so as to prevent an effective rotation of the switch-disc 88 in a direction to cause a further elevation of the carriage. When the carriage is automatically stopped in its completely lowered position the edge portion of the upper half of plate 84 will be positioned in the path of rotation of crank-arm 91 to prevent a further lowering movement of the motor and carriage.

Figures 4, 5:
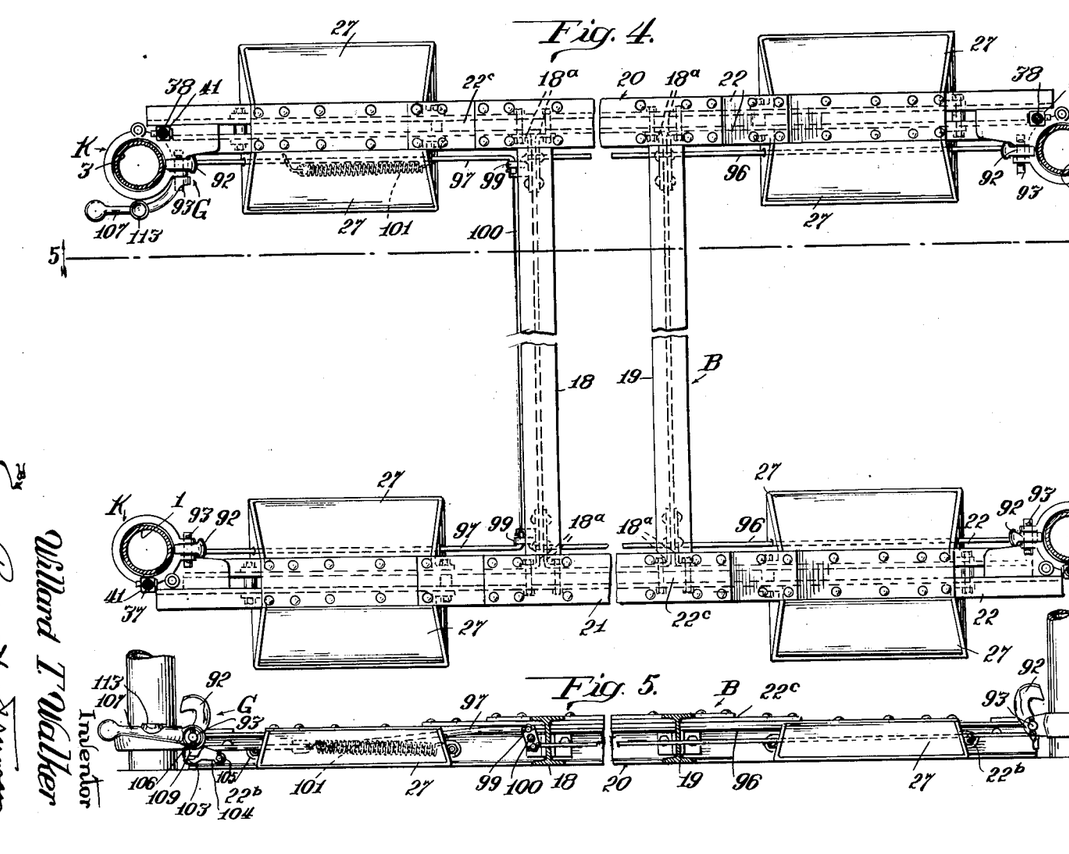
Fig. 4 is a horizontal section on a larger scale and with parts broken away, the view being taken substantially on the line 4—4 of Fig. 2.
Fig. 5 is a partial vertical section taken substantially on the line 5—5 of Fig. 4.
Figures 8, 10, 11:
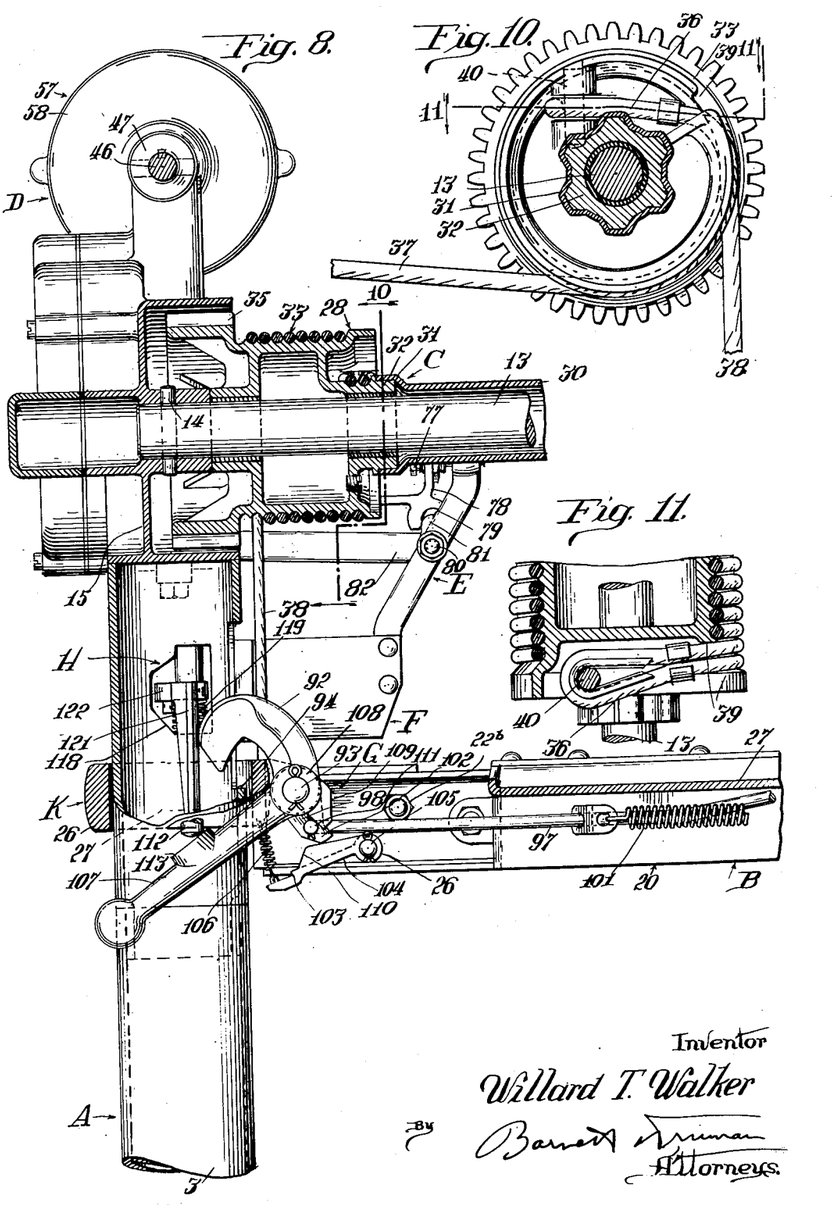
Fig. 8 is a vertical section taken substantially on the line 8—8 of Fig. 6.
Fig. 10 is a detail vertical section taken substantially on the line 10—10 of Fig. 8.
Fig. 11 is a detail sectional view taken substantially on the line 11—11 of Fig. 10.

The safety latch mechanism G comprises four similar hooks 92, each pivoted on a horizontal axis 93 carried by one of the guide castings 26 at the respective ends of the cross members 20 and 21 of carriage B. These hooks 92 may be retracted to the inoperative positions shown in Figs. 4 and 5, or may be swung out, as shown in Fig. 8, into slots or recesses 94 formed in the respective posts or uprights 1, 2, 3 and 4. These openings 94 are so positioned as to receive the hooks when the carriage has been completely elevated. A second similar set of recesses 95 may be provided in the posts corresponding to a lower position of the carriage, or a plurality of such openings may be provided in each post, if desired. Operating rods 96 and 97 are pivotally connected at their outer ends to the short downwardly extending arms 98 of the several hooks 92, the inner ends of each pair of operating rods 96 and 97 being connected to the opposite ends of a double crank arm 99 keyed on a rotatable shaft 100 extending longitudinally of one angle bar 18 of the carriage B and mounted in suitable bearings therein. These link and lever connections will compel the several hooks 92 to move simultaneously from their operative to their inoperative positions. A spring 101 housed within one of the ramps 27, is connected at one end to an intermediate portion of operating rod 97 and is anchored at its other end to one end wall of the ramp. This spring normally tends to throw the several hooks 92 outwardly to their effective positions. The hook 92 which is positioned adjacent the post 3 is provided on the lower end of its crank arm 98 with a latch projection 102 adapted to engage a shoulder 103 formed on a latch member 104 pivoted at 105 and normally pulled upwardly by spring 106. An operating lever 107 pivoted at 108 on the pivot pin 93 of the hook 92 is formed with a downwardly extending cam-arm 109 adapted to engage a cam surface 110 formed on the upper side of latch lever 104. If operating lever 107 is swung downwardly (as shown in Fig. 8) the cam 109 will engage the cam surface 110 to swing latch lever 104 downwardly against the resistance of spring 106 and disengage the shoulder 103 from the latch 102 on the lower end of hook 92, whereupon the spring 101 will, through the link and lever connections already described, simultaneously swing all of the hooks 92 outwardly into the openings 94 in the respective posts. It is not intended that the hooks 92 shall engage the posts, but the hooks are merely moved into position to engage the posts and support the carriage B and the automobile in case the cable mechanism should break or be released. The carriage and automobile are normally supported at all times by the cables when the load has been elevated. In order to withdraw the safety latches, the operating handle 107 is swung upwardly at which time the opposite face of the cam arm 109 engages the pin 111 (which may be the projecting end of the adjacent link 97), thereby swinging all of the hooks 92 into their withdrawn positions, and the shoulder 103 on pivoted latch member 104 will automatically engage the detent 102 formed on the lower end of hook 92 so as to hold the latch assembly in this withdrawn position. It will thus be apparent that by swinging the operating handle 107, the safety latches may be thrown out or withdrawn at any time.

Figure 9:
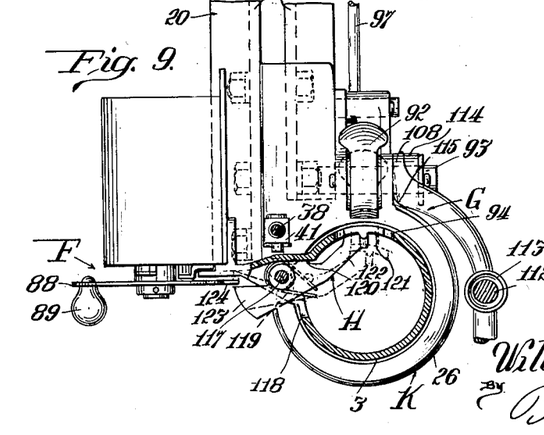
Fig. 9 is a horizontal section taken substantially on the line 9—9 of Fig. 6.

A rod or post 112 is secured to an upper frame member 16 and projects downwardly at the side of post 3 but outside of the path of guide loop 26 in such position that the lower end of this post will engage a cupped portion 113 formed on the operating arm 107 and automatically swing this arm downwardly to release the safety latches when the carriage has been elevated to its extreme upper position with the hooks 92 opposite the openings 94 in the posts. In order that the operating handle 107 may be swung upwardly around the post 112 so as to withdraw the hooks, a rubber washer 114 is positioned on pivot pin 93 outside of the pivoted portion 108 of the lever, which is cut away at 115 so as to permit the lever to be swung outwardly away from the post 3 (see Fig. 9). By moving the lever 107 outwardly away from the post and then swinging it upwardly, the latch mechanism is withdrawn. As the carriage moves downwardly, the lever 107 will automatically swing back into position beneath the post 112.

The interlocking mechanism indicated generally at H comprises a swinging gate member pivoted on a vertical axis at 117 and projecting through an opening 118 formed in post 3. A torsion spring 119 normally swings this gate member so that a stop 120 engages the fixed supporting bracket, in which position a closure plate 121 carried by arm 122 of the gate member will be positioned in the hook-receiving opening 94. When the hook 92 is thrown out so as to be projected through opening 94, the hook will engage closure plate 121 and swing the gate member about its pivotal axis 117 so that a stop plate 123 formed on an oppositely extending arm of the gate member will be positioned within the path of a shoulder 124 formed on the switch disc 88 (see Fig. 6). This shoulder 124 is so positioned that it will engage the stop plate 123 before the switch disc has been rotated far enough to start the motor in a direction to lower the load. As a consequence, it is impossible to start the motor to lower the automobile until the safety latches have been manually withdrawn by elevating the lever 107 in the manner already described. When the hooks have been automatically withdrawn, the safety gate H will automatically swing to the position shown in solid lines in Fig. 9, thus moving stop plate 123 out of the path of shoulder 124 on switch disc 88 and permitting the motor to be started to lower the carriage B and the automobile carried thereby.

Figure 2:
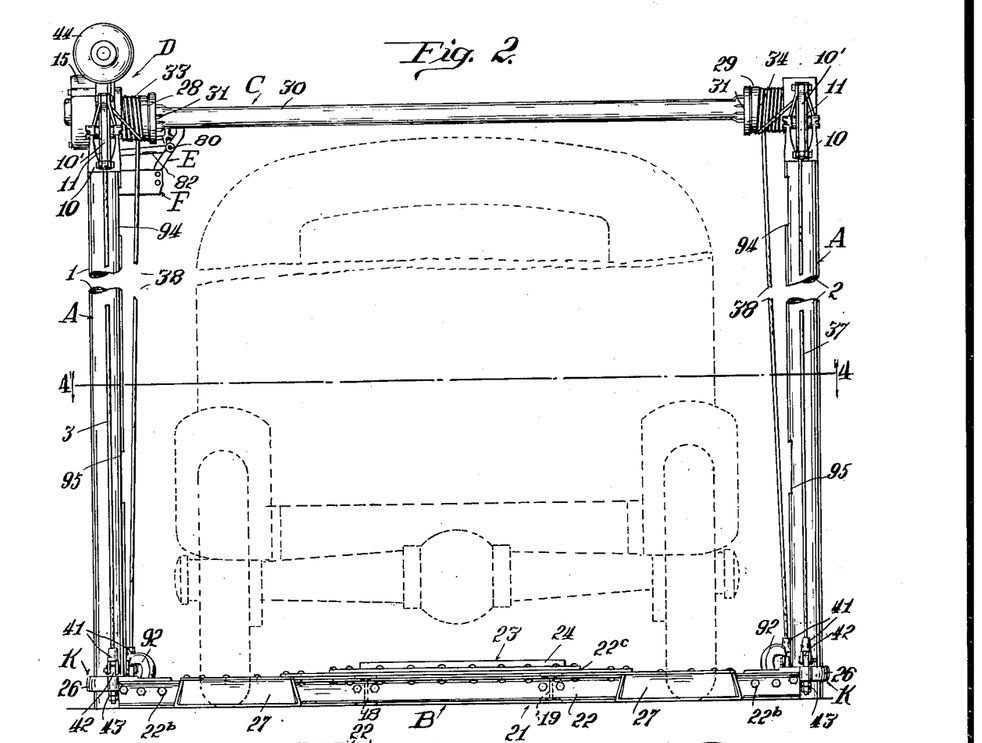
Fig. 2 is an end view on a somewhat larger scale, the view being taken looking from the right at Fig. 1, but showing the automobile lowered.

In the general operation of this improved hoisting mechanism, assuming that the carriage B is lowered, as shown in Fig. 2, the automobile is driven or moved into the space between the side members of the frame through the open end thereof between the posts 1 and 2, the wheels moving over the ramps 27 on the cross member 21. The rest or cradle 23 may then be adjusted longitudinally of the beams 18 and 19, if necessary, so as to properly position this cradle beneath the differential of the automobile. When the carriage B is elevated, this cradle will engage the differential casing to support the rear end of the car, and the beams 18 and 19 will engage the front axle of the car to support the front end thereof. If necessary, rests or blocks may be positioned between the beams 18 and 19 and the axle. With the car properly positioned within the frame, the switch handle 89 is swung up so as to start the motor 44 and cause the winding mechanism to draw in the several cables, thus elevating the carriage B and the automobile carried thereby. When the carriage approaches its uppermost position, as indicated in Figs. 1, 6, 7 and 8, the operating handle 107 will engage the fixed post 112 so as to release the safety latches 92 which will be projected through the openings 94 in the several posts by the spring 101. At this time the travelling nut 73 of the stop mechanism E will engage the nut 77 of carriage 78 and cause the stop mechanism to return switch F to its neutral position, thus stopping the motor. When the safety latch mechanism G is thrown to operative position, the interlocking mechanism H will cause the plate 123 to be moved into the path of shoulder 124 on switch disc 88 so that it is impossible to reverse the motor and cause the carriage to move down until the safety latches are manually released by swinging up the handle 107. The stop plate 84 will also function, as already described to prevent starting the motor in a direction to cause further elevation of the carriage.

When the car is to be lowered, the handle 107 is first manipulated to release the safety latches G, and then switch handle 89 is swung down to reverse the motor 44 and cause the carriage B and the automobile to be lowered. When the carriage reaches its lowermost position, the travelling nut 73 of the stop mechanism E will engage nut 76 on carriage 78 and cause the switch mechanism F to be thrown to neutral position, thus again stopping the motor. The automobile may then be pushed out or run out under its own power through either end of the frame.

It will be noted that the automobile may be raised so that the greater portion thereof is above the over-all height of the hoist, and when in this position no portion of the hoist with the exception of the posts 1, 2, 3 and 4 is positioned below the lowermost portions of the automobile. The space underneath the automobile and around and between the posts or uprights is thus entirely clear to permit easy access to the chassis from below. Since the carriage B is supported from adjacent its ends, the greater portion of the under side of the car is exposed, only the beams 18 and 19 which have small lateral thickness, being positioned beneath the car.

A carriage B, such as hereinafter described, permits the wheels of the automobile to be rotated, which is often desirable. If preferred, a form of carriage such as is shown in Fig. 15 may be used in which runways 125 supported on cross-beams 20 and 21 and provided with ramps 126 at their ends for receiving wheels are substituted for the beams 18 and 19. With such a construction the entire lower surface of the car or chassis is exposed, but the wheels cannot be rotated. If desired, the carriage B may be omitted entirely and hooks or other devices suspended from the lower ends of the cable runs for engaging suitable members on the automobile or other vehicle for lifting the same.

A hoisting mechanism of this type is quite simple and economical, and easy to assemble and erect. It may be mounted in any suitable space of slightly greater lateral dimensions than the car itself, where there is sufficient overhead room to permit the automobile to be elevated. As already noted, it may be mounted on the floor of a garage or other building, if it is not convenient to embed the lower ends of the posts, as shown in the preferred form.

While the carriage will ordinarily be run to either its extreme upper or lower positions, it is quite possible by manual manipulation of control switch F to stop the carriage at any intermediate height and afterwards run it either up or down as may be desired. If openings 95 are provided in the posts at the intermediate elevation or elevations most often used, the safety hooks 92 may be thrown out at such positions by swinging lever 107 downwardly, and subsequently withdrawn by simply elevating the lever 107 to its normal position.

It will be apparent that this hoist is adapted for elevating other types of vehicles, and that by making appropriate changes in the form of the carriage the mechanism can be adapted for a great variety of other hoisting purposes. Many of the specific improvements shown might be used in other forms of hoisting mechanism, and such uses are contemplated as being within the scope of the claims which follow.

I claim:

1. An automobile hoist comprising a supporting frame consisting of four upright posts supported adjacent the corners of a substantially rectangular clear space suitable for receiving the automobile, bracing means connecting the upper end portions of the two posts at each side of the space, a shaft rotatably supported across one upper end of the frame, a pair of winding drums one carried by each end portion of the shaft adjacent the upper ends of two of the posts, direction sheaves supported adjacent the upper ends of the posts at the other end of the frame, cables each anchored at one end so as to wind on a drum, two of the cables extending over the direction sheaves and the vertical runs of the several cables extending downwardly adjacent the several posts, means carried by the lower end portions of the cables for suspending the automobile, and means supported adjacent the upper end of one of the posts for rotating the drums.

2. A hoist comprising a supporting frame consisting of four upright posts supported adjacent the corners of a substantially rectangular clear space suitable for receiving the load, bracing means connecting the upper end portions of the two posts at each side of the space, and a non-rotary shaft connecting the upper end portions of the posts at one end of the frame, a pair of winding drums rotatable on the shaft one adjacent each of these end posts, a torque tube connecting the drums, direction sheaves supported adjacent the upper ends of the posts at the other end of the frame, cables each anchored at one end so as to wind on one of the drums, two of the cables extending over the direction sheaves and the vertical runs of the several cables extending downwardly adjacent the several posts, means carried by the lower ends of the cables for suspending the load, and means for rotating the drums.

3. An automobile hoist comprising a supporting frame consisting of four upright posts supported adjacent the corners of a substantially rectangular clear space suitable for receiving the automobile, bracing means connecting the upper end portions of the two posts at each side of the space, and a non-rotary shaft connecting the upper end portions of the posts at one end of the frame, a pair of winding drums rotatable on the shaft one adjacent each of these end posts, a torque tube connecting the drums, direction sheaves supported adjacent the upper ends of the posts at the other end of the frame, cables each anchored at one end so as to wind on one of the drums, two of the cables extending over the direction sheaves and the vertical runs of the several cables extending downwardly adjacent the several posts, means carried by the lower ends of the cables for suspending the automobile, and motor means supported adjacent the upper end of one of the posts for rotating the adjacent drum.

4. A hoist comprising a supporting frame consisting of four upright posts supported adjacent the corners of a substantially rectangular clear space suitable for receiving the load, bracing means connecting the upper end portions of the two posts at each side of the space, a shaft rotatably supported across one upper end of the frame, a pair of winding drums one carried by each end portion of the shaft adjacent the upper ends of two of the posts, direction sheaves supported adjacent the upper ends of the posts at the other end of the frame, cables each anchored at one end so as to wind on one drum, two of the cables extending over the direction sheaves and the vertical runs of the several cables extending downwardly adjacent the several posts, a carriage guided for vertical movement between the posts and adapted to support the load, the lower ends of the cables suspending the carriage, and means for rotating the drums.

5. An automobile hoist comprising a supporting frame consisting of four upright posts supported adjacent the corners of a substantially rectangular clear space suitable for receiving the automobile, bracing means connecting the upper end portions of the two posts at each side of the space, and a non-rotary shaft connecting the upper end portions of the posts at one end of the frame, a pair of winding drums rotatable on the shaft, one adjacent each of these end posts, a torque tube connecting the drums, direction sheaves supported adjacent the upper ends of the posts at the other end of the frame, cables each anchored at one end so as to wind on one of the drums, two of the cables extending over the direction sheaves and the vertical runs of the several cables extending downwardly adjacent the several posts, a carriage guided for vertical movement between the posts and adapted to support the automobile, the lower ends of the cables suspending the carriage, motor means supported adjacent the upper end of one of the posts, and positive reduction gearing connecting the motor with the adjacent drum.

6. A hoist comprising an open supporting frame positioned about a substantially rectangular clear space for receiving the load, a pair of winding drums rotatably supported one adjacent each upper corner of one end of the frame, a direction sheave rotatably supported at each upper corner of the other end of the frame, means for simultaneously rotating the drums in either direction, two intermediately looped cables one for each drum, one end portion of a cable extending downwardly from a drum adjacent one corner of the frame, the other end portion of the cable extending from the drum over the sheave at the other end of that side of the frame and then extending downwardly, means for supporting the load from the several downwardly extending runs of the cables, each drum being formed with a double spiral groove in which the two runs of the cable are wound side by side, and means for anchoring the looped end of the cable to the drum.

7. An automobile hoist comprising a supporting frame consisting of four upright posts supported adjacent the corners of a substantially rectangular clear space suitable for receiving the automobile, bracing means connecting the upper ends of the posts at each side of the frame, a pair of winding drums one rotatably supported adjacent the upper end of each post at one end of the frame, a direction sheave rotatably supported at the upper end of each post at the other end of the frame, means for simultaneously rotating the drums in either direction, two intermediately looped cables one for each drum, one end portion of a cable extending downwardly from a drum adjacent one of the posts, the other end portion of the cable extending from the drum over the sheave at the other end of that side of the frame and then extending downwardly adjacent the post which supports the sheave, means for supporting the automobile from the several downwardly extending runs of the cables, each drum being formed with a double spiral groove in which the two runs of the cable are wound side by side, and means for anchoring the looped end of the cable to the drum.

8. A hoist comprising a fixed supporting frame, a carriage vertically movable within the frame, cables suspending the carriage, winding means carried by the frame for drawing in or paying out the cables, and means for rotating the winding means comprising a reversible motor, reducing gearing between the motor and winding means, switch mechanism for starting the motor in either direction and for stopping the same, and an automatic brake comprising a constantly acting friction drag mechanism and a one-way clutch between the drag mechanism and the gearing whereby the drag will only be operative when the motor and gearing is rotating in the direction to lower the carriage.

9. A hoist comprising a supporting frame including upright posts positioned adjacent a clear space suitable for receiving the load, hoisting means carried by the frame including a carriage vertically movable between the posts, and a plurality of guide means mounted on the carriage and each extending about one of the posts, said guide means being freely movable vertically along the posts when the carriage is in normal horizontal position but moving into binding engagement with the posts to support the carriage in case the carriage is tilted.

10. A hoist comprising a supporting frame including upright posts positioned adjacent a clear space suitable for receiving the load, a carriage vertically movable between the posts, means for suspending the carriage between the posts and raising and lowering the carriage, and guide loops mounted on the carriage and each extending around one of the posts, the loops being freely movable vertically along the posts when the carriage is suspended in normal position but moving into binding engagement with the posts to support the carriage in case the carriage is tilted through failure of a portion of the suspension means.

11. A hoist comprising a supporting frame including upright posts positioned adjacent a clear space suitable for receiving the load, a carriage vertically movable between the posts, means for raising and lowering the carriage comprising a plurality of cables by means of which the carriage is normally suspended between the posts, and guide loops mounted on the carriage and each extending around one of the posts, the loops being freely movable along the posts when the carriage is suspended in normal position but moving into binding engagement with the posts to support the carriage in case the carriage is tilted by failure of one or more of the cables.

12. A hoist comprising a supporting frame, hoisting means carried by the frame including a carriage vertically movable within the frame, latch members mounted on the carriage, means interconnecting the latch members for causing simultaneous movements thereof, means normally tending to automatically project the latch members into position to engage the frame and support the carriage, means for releasably locking the latch members in retracted positions, and means for automatically releasing the locking means when the carriage reaches a predetermined elevation.

13. A hoist comprising a supporting frame, hoisting means carried by the frame including a carriage vertically movable within the frame, latch members mounted on the carriage, means interconnecting the latch members for causing simultaneous movements thereof, means normally tending to automatically project the latch members into position to engage the frame and support the carriage, means for releasably locking the latch members in retracted positions, and a manually operable means mounted on the carriage and movable to retract the latch members or to release the locking means so that the latch members may be projected into position to engage the frame.

14. A hoist comprising a supporting frame, hoisting means carried by the frame including a carriage vertically movable within the frame, latch members mounted on the carriage, means interconnecting the latch members for causing simultaneous movements thereof, means normally tending to automatically project the latch members into position to engage the frame and support the carriage, means for releasably locking the latch members in retracted positions, a lever mounted on the carriage and movable to retract the latch members or to release the locking means, and a member carried by the frame in position to engage and move the lever to release the locking means when the carriage reaches a predetermined elevation.

15. A hoist comprising a supporting frame, hoisting means carried by the frame including a carriage vertically movable within the frame, latch members mounted on the carriage means interconnecting the latch members for causing simultaneous movement thereof, means normally tending to automatically project the latch members into position to engage the frame and support the carriage, means for releasably locking the latch members in retracted positions, means for automatically releasing the locking means when the carriage reaches a predetermined elevation, and means for automatically stopping the hoisting means when the carriage reaches this elevation.

16. A hoist comprising a supporting frame, hoisting means carried by the frame including a carriage vertically movable within the frame, latch members mounted on the carriage, means interconnecting the latch members for causing simultaneous movements thereof, means normally tending to automatically project the latch members into position to engage the frame and support the carriage, means for releasably locking the latch members in retracted positions, means for automatically releasing the locking means when the carriage reaches a predetermined elevation, means for automatically stopping the hoisting means when the carriage reaches this elevation and means automatically operated when the latch members are projected to prevent a lowering operation of the hoisting mechanism until the latches have been retracted.

17. An automobile hoist comprising a supporting frame consisting of upright posts supported adjacent the corners of a substantially rectangular clear space suitable for receiving the automobile, means carried by the posts for raising and lowering the automobile, said means comprising cables having substantially vertical runs extending downwardly adjacent the several posts, a carriage comprising longitudinal members adapted to extend beneath and support the automobile, and cross-members supporting the longitudinal members, the lower ends of the cables being attached to the cross members, guide means at the ends of the cross members loosely engaging the posts, latch members carried by the several end portions of the cross members and movable into position to engage the posts and support the carriage, means interconnecting the latch members for causing simultaneous movements thereof, spring means for automatically projecting the latch members into position to engage the posts, means for releasably locking the latch members in retracted positions, a lever carried at one end of one of the cross members for retracting the latch members or for releasing the locking means to permit the latch members to be projected into the recesses, and a projection carried by the frame for engaging the lever to automatically release the locking means when the carriage reaches a predetermined elevation, means for automatically stopping the elevating means when the carriage reaches this elevation, and means operated by the latch mechanism when projected for automatically preventing operation of the lowering mechanism until the latches have been retracted.

18. A hoist comprising a supporting frame, a carriage, mechanism for suspending the carriage within the frame and for raising and lowering the carriage, motor means for actuating the raising and lowering mechanism, a control switch for the motor means, latch mechanism mounted on the carriage and movable into position for engaging the frame to support the carriage and means positioned by the latch mechanism when moved into position to engage the frame for locking the switch mechanism to prevent starting a lowering movement of the carriage.

19. A hoist comprising a supporting frame, a carriage, mechanism for suspending the carriage within the frame and for raising and lowering the carriage, motor means for actuating the raising and lowering mechanism, a control switch for the motor means, latch mechanism mounted on the carriage and movable into position for engaging the frame to support the carriage, means for automatically moving the latch mechanism into position to engage the frame when the carriage reaches a predetermined elevation, and means positioned by the latch mechanism when moved to this frame engaging position for locking the switch mechanism to prevent starting a lowering movement of the carriage.

20. An automobile hoist comprising a supporting frame positioned about an open space into which the automobile may be moved, a carriage vertically movable in the frame, and means for raising and lowering the carriage, the carriage comprising a pair of cross members one at each end of the carriage, means connecting the central portions of the cross members so as to be positioned between the wheels of the automobile and ramps carried by the cross members in the path of movement of the wheels.

21. An automobile hoist comprising four posts positioned adjacent the corners of an open space through which an automobile may be moved, a carriage vertically movable between the posts and means carried by the posts for raising and lowering the carriage, the carriage comprising a pair of end cross members, each guided for vertical movement between the pair of posts at that end of the space, means connecting the central portions of the cross members so as to be positioned between the wheels of the automobile, and ramps on the cross members in the path of movement of the wheels.

22. A hoist comprising a supporting frame, hoisting means carried by the frame including a carriage vertically movable within the frame, latch members mounted on the carriage and movable into or out of position to engage the frame, and mechanism interconnecting the latch members for causing simultaneous movements thereof, said mechanism including means which tends to automatically move the latch members to frame engaging position, means for holding the latches in withdrawn position, and manually operable means which when moved to one position withdraws the latches into position to be engaged by the holding means and when moved to another position releases the holding means to permit the latches to automatically engage the frame.

23. An automobile hoist comprising four upright posts supported at their lower ends adjacent the four corners of a clear space which extends upwardly between and beyond the tops of the posts so that an automobile may be elevated between the posts until the automobile projects upwardly beyond the posts, the posts being unconnected except adjacent the upper ends thereof so that the spaces between the posts are unobstructed when the automobile is elevated, and hoisting means carried by the upper portions of the posts for supporting and raising and lowering the automobile, said hoisting means comprising winding drums positioned adjacent the upper ends of two of the posts, means for simultaneously rotating the drums, direction sheaves positioned adjacent the upper ends of the other two posts, a plurality of cables each anchored at one end to one of the drums and winding thereon, two of the cables extending downwardly from the drums adjacent the first mentioned posts and two of the cables extending substantially horizontally from the drums at opposite sides of the clear space to and over the direction sheaves and then downwardly adjacent the second pair of posts, and means carried by the lower ends of the cables for supporting an automobile.

24. An automobile hoist comprising four upright posts supported at their lower ends adjacent the four corners of a clear space which extends upwardly between and beyond the tops of the posts so that an automobile may be elevated between the posts until the automobile projects upwardly beyond the posts, the posts being unconnected except adjacent the upper ends thereof so that the spaces between the posts are unobstructed when the automobile is elevated, hoisting means carried by the upper portions of the posts for supporting and raising and lowering the automobile, said hoisting means comprising a carriage guided for vertical movement between the posts, a pair of winding drums positioned adjacent the upper ends of two of the posts, direction sheaves supported adjacent the upper ends of the other two posts, a motor for rotating the drums supported adjacent the upper end of one of the first mentioned posts, and a plurality of cables extending from the drums to the several corner portions of the carriage, two of the cables extending substantially horizontally adjacent the upper ends of the posts at opposite sides of the clear space from the winding drums to and over the direction sheaves, and the vertical runs of all of the cables extending downwardly adjacent the respective posts.

25. In a hoisting apparatus, a supporting frame, a winding drum, means for rotating the drum, a cable which is intermediately looped so as to provide two load-supporting runs, the drum being grooved to receive the two runs of the cable side by side, there being an opening within the drum through which the looped end of the cable is passed, and means for anchoring the looped end of the cable within the drum.

26. In a hoisting apparatus, a supporting frame, a winding drum, means for rotating the drum, a cable which is intermediately looped so as to provide two load-supporting runs, the drum being grooved to receive the two runs of the cable side by side, there being an opening within the drum through which the looped end of the cable is passed, and a removable pin passed through the looped end of the cable and anchored within the drum.

27. A hoist comprising a supporting frame including upright posts positioned adjacent a clear space suitable for receiving the load, hoisting means carried by the frame comprising a carriage vertically movable between the posts, and a plurality of guide means mounted on the carriage and each engaging one of the posts, each of said guide means being freely movable vertically along its post when the carriage is in normal horizontal position but moving into binding engagement with the post to support the carriage in case the carriage is tilted.

28. An automobile hoist comprising four posts positioned adjacent the corners of an open space through which an automobile may be moved, a carriage vertically movable between the posts and means carried by the posts for raising and lowering the carriage, the carriage comprising a pair of end cross members, each guided for vertical movement between the pair of posts at that end of the space, and means connecting the central portions of the cross members so as to be positioned between the wheels of the automobile, the cross members being formed beyond the sides of the last mentioned means with runways to facilitate the movement of the wheels over the cross members when the automobile is moved into or out of the space.

WILLARD T. WALKER.